United States Patent
Brännström et al.

(10) Patent No.: US 9,867,069 B2
(45) Date of Patent: Jan. 9, 2018

(54) MEASUREMENT BASED QOS ADAPTATION

(75) Inventors: Nils Brännström, Stockholm (SE);
Erik Geijer Lundin, Stockholm (SE);
Peter Lundh, Skärholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 127 days.

(21) Appl. No.: 14/378,000

(22) PCT Filed: Feb. 22, 2012

(86) PCT No.: PCT/SE2012/050196
§ 371 (c)(1),
(2), (4) Date: Aug. 14, 2014

(87) PCT Pub. No.: WO2013/125994
PCT Pub. Date: Aug. 29, 2013

(65) Prior Publication Data
US 2015/0023195 A1    Jan. 22, 2015

(51) Int. Cl.
*H04W 24/08* (2009.01)
*H04W 28/22* (2009.01)
(Continued)

(52) U.S. Cl.
CPC ........... *H04W 24/08* (2013.01); *H04L 47/828* (2013.01); *H04W 28/0236* (2013.01);
(Continued)

(58) Field of Classification Search
None
See application file for complete search history.

(56) References Cited

U.S. PATENT DOCUMENTS 8,345,691 B2 * 1/2013 Lee .................. H04L 47/14
370/395.4
2003/0002518 A1 * 1/2003 Shibutani .......... H04W 72/1231
370/442
(Continued)

FOREIGN PATENT DOCUMENTS

EP          1 753 179        2/2007
WO    WO 03/043273 A1       5/2003
(Continued)

OTHER PUBLICATIONS

Supplemental European Search Report for International application No. EP 12 86 9232, dated Aug. 20, 2015.
(Continued)

*Primary Examiner* — Peter Chau
(74) *Attorney, Agent, or Firm* — Baker Botts, LLP

(57) ABSTRACT

The invention relates to a method and device (14) of controlling bit rate of a terminal (11, 12, 13) included in a group of terminals. To this end, a method is provided comprising the steps of acquiring a predetermined QoS parameter for the terminal, which parameter stipulates target QoS to be given to the terminal relative to other terminals in the group, and acquiring either one or both of (a) at least one measure of a channel condition of the terminal and (b) at least one capacity measure of the terminal. Further, the method comprises the step of controlling the bit rate of the terminal on the basis of a reference weighting factor created by a combination of the acquired predetermined QoS parameter, the acquired at least one measure of a channel condition of the terminal and/or the acquired at least one capacity measure of the terminal.

9 Claims, 4 Drawing Sheets

(51) Int. Cl.
    *H04L 12/911* (2013.01)
    *H04W 28/02* (2009.01)
    *H04W 28/24* (2009.01)

(52) U.S. Cl.
    CPC .......... *H04W 28/22* (2013.01); *H04L 47/824* (2013.01); *H04W 28/24* (2013.01)

(56) References Cited

U.S. PATENT DOCUMENTS

| | | | |
|---|---|---|---|
| 2004/0203822 A1* | 10/2004 | Vitebsky ............. | H04L 12/5693 455/452.1 |
| 2005/0063341 A1 | 3/2005 | Ishii et al. | |
| 2005/0063389 A1* | 3/2005 | Elliott ................. | H04L 12/1881 370/395.4 |
| 2007/0025301 A1* | 2/2007 | Petersson ............ | H04L 47/10 370/338 |
| 2009/0274108 A1* | 11/2009 | Hayashi ............... | H04L 47/10 370/329 |
| 2010/0124887 A1* | 5/2010 | Wellington .......... | H04W 24/04 455/69 |
| 2012/0263120 A1* | 10/2012 | Gopalakrishnan ....................... | H04W 72/1226 370/329 |
| 2013/0095764 A1* | 4/2013 | Rodbro ................ | H04W 28/10 455/67.11 |

FOREIGN PATENT DOCUMENTS

| | | |
|---|---|---|
| WO | WO 03/071740 A1 | 8/2003 |
| WO | WO 2012/095169 | 7/2012 |

OTHER PUBLICATIONS

International Search Report for International Application No. PCT/SE2012/050196, dated Feb. 22, 2013.

PCT Written Opinion of the International Searching Authority for International Application No. PCT/SE2012/050196, dated Feb. 21, 2013.

"Scheduling Algorithms for Policy Driven QoS Support in HSDPA Networks"by Joseph S. Gomes et al, 2007.

"QoS Load Differentiation Application in a UTRAN Live Network"by Beatriz Garriga et al, 2009.

"Scheduling for Differentiated Traffic Types in HSDPA Cellular Systems"by Flavio De Angelis, Ibrahim Habib, Giovanni Giambene, and Samuele Giannetti, 2005.

* cited by examiner ion Serial No. PCT/SE2012/050196, filed Feb. 22, 2012
MEASUREMENT BASED QOS ADAPTATION

PRIORITY

This nonprovisional application is a U.S. National Stage Filing under 35 U.S.C. §371 of International Patent Application Serial No. PCT/SE2012/050196, filed Feb. 22, 2012 and entitled "Measurement Based QOS Adaptation."

TECHNICAL FIELD

The invention relates to a method and device of controlling bit rate of a terminal included in a group of terminals.

BACKGROUND

With increasing traffic demand, radio networks are more frequently experiencing high load, either in the transport network or over the air interface. The increasing load in the networks may result in users requesting differentiation based on e.g. which type of subscription a user holds. As a consequence, it may be desirable for the network operators to provide differentiation in Quality of Service (QoS) between different user subscription types in a radio environment where limitations in bandwidth are experienced. This differentiation is commonly attained by providing different QoS to different users. Currently, the QoS measure is primarily implemented as relative bit rates, i.e. different subscriber types are provided differentiated bit rates, which has as an effect that users sharing the same network bottleneck at least from an average perspective shall experience differentiated bit rates governed by their subscription types. Thus, the users are graded according to an order of priority stipulated by the subscription type of the respective user. These subscription types may be graded as for example Gold, Silver and Bronze subscriptions, and their target QoS weights may be exemplified as 4, 2 and 1, respectively. This implies that the intention of the network operator is that a Gold user shall have twice the bit rate of a Silver user and four times that of a Bronze user over some period of time, given that all other conditions are the same for the different users.

Network throughput can be severely reduced due to limitations in the radio transceiver of a single user or if the user has a radio transceiver which consumes a great deal of the resources shared with other users. Examples of such resources are base station transmission power in the case of downlink transmission over the air interface, and shared bandwidth in the transport network. The network throughput may further be severely reduced in a situation where terminals are physically far from the base station, as the relative cost for providing a remote terminal with a given QoS is higher the further away the terminal is. Limitations may also occur in transport of data between Radio Network Controller (RNC) and NodeB.

Field studies show that actual relative bit rate for a user heavily depends on circumstances that are difficult or even impossible for the network operator to control, such as long term radio environment of a user. Field measurements have shown that the relative bit rate sometimes is higher than targeted for a user in a "good" radio environment. In the transport network, the relative bit rate may for example depend on the number of concurrent Transmission Control Protocol (TCP) flows that a user utilizes. Further, with the exemplified subscription types, the choice of assigning a particular bit rate to a user does not only dependent on the current subscription type, but also who has experienced a relatively low bit rate recently and thus should be prioritized and scheduled for transmission.

In practice, since the actual QoS of a user is dependent on numerous factors other than the current subscription type, it is thus difficult for a network operator to specify a policy in the form of target QoS weights and corresponding relative bit rates that in fact is conformed with. To conclude, these circumstances lead to the problem that a user with a subscription stipulating a higher priority than that of another user, for example a Gold user versus a Bronze user, still may experience a lower bit rate than that of the lower priority user, even though channel conditions are the similar for the two users which is a highly unwanted network behaviour.

SUMMARY

An object of the present invention is to solve, or at least mitigate, the problem in the art of specifying a policy that is conformed with and provide an improved approach for differentiating bit rate of terminals.

This object is attained in a first aspect of the present invention by a method of controlling bit rate of a terminal included in a group of terminals. The method comprises the steps of acquiring a predetermined Quality of Service (QoS) parameter for the terminal, which parameter stipulates target QoS to be given to the terminal relative to other terminals in the group, and acquiring at least one measure of a channel condition of the terminal. Further, the method comprises the step of controlling the bit rate of the terminal on the basis of a reference weighting factor created by a combination of the acquired predetermined QoS parameter and the acquired at least one measure of a channel condition of the terminal.

This object is attained in a second aspect of the present invention by a method of controlling bit rate of a terminal included in a group of terminals. The method comprises the steps of acquiring a predetermined QoS parameter for the terminal, which parameter stipulates target QoS to be given to the terminal relative to other terminals in the group, and acquiring at least one capacity measure of the terminal. Further, the method comprises the step of controlling the bit rate of the terminal on the basis of a reference weighting factor created by a combination of the acquired predetermined QoS parameter and the acquired at least one capacity measure of the terminal.

This object is attained in a third aspect of the present invention by a method of controlling bit rate of a terminal included in a group of terminals. The method comprises the steps of acquiring a predetermined QoS parameter for the terminal, which parameter stipulating target QoS to be given to the terminal relative to other terminals in the group, and acquiring at least one measure of a channel condition of the terminal and at least one capacity measure of the terminal. Further, the method comprises the step of controlling the bit rate of the terminal on the basis of a reference weighting factor created by a combination of the acquired predetermined QoS parameter, the acquired at least one measure of a channel condition of the terminal and the acquired at least one capacity measure of the terminal.

This object is attained in a fourth aspect of the present invention by a device for controlling bit rate of a terminal included in a group of terminals. The device comprises a processing unit being arranged to acquire a predetermined QoS parameter for the terminal, said parameter stipulating target QoS to be given to the terminal relative to other terminals in the group. The processing unit is further arranged to acquire at least one measure of a channel condition of the terminal and control the bit rate of the terminal on the basis of a reference weighting factor created by a combination of the acquired predetermined QoS parameter and the acquired at least one measure of a channel condition of the terminal.

This object is attained in a fifth aspect of the present invention by a device for controlling bit rate of a terminal included in a group of terminals. The device comprises a processing unit being arranged to acquire a predetermined QoS parameter for the terminal, said parameter stipulating target QoS to be given to the terminal relative to other terminals in the group. Further, the processing unit is arranged to acquire at least one capacity measure of the terminal and control the bit rate of the terminal on the basis of a reference weighting factor created by a combination of the acquired predetermined QoS parameter and the acquired at least one capacity measure of the terminal.

This object is attained in a sixth aspect of the present invention by a device for controlling bit rate of a terminal included in a group of terminals. The device comprises a processing unit being arranged to acquire a predetermined QoS parameter for the terminal, said parameter stipulating target QoS to be given to the terminal relative to other terminals in the group. The processing unit is further arranged to acquire at least one measure of a channel condition of the terminal and at least one capacity measure of the terminal and control the bit rate of the terminal on the basis of a reference weighting factor created by a combination of the acquired predetermined QoS parameter, the acquired at least one measure of a channel condition of the terminal and the acquired at least one capacity measure of the terminal.

Thus, the present invention advantageously considers a predetermined QoS parameter and either one or both of the at least one measure reflecting a physical channel condition of the terminal and the at least one capacity measure of the terminal. The QoS parameter is typically preset by an operator of the network in which the terminal is located. As previously has been mentioned, the QoS parameter may reflect the type of subscription that the user of the terminal has applied to, such as whether the subscription has Gold, Silver or Bronze status, and hence reflects a target QoS to be given to the terminal. Thus, the predetermined QoS parameter reflecting subscription status is considered, and further either one or both of the channel condition measure of the terminal and the capacity measure of the terminal. This is highly advantageous, since the measuring and considering of the actual channel condition greatly will facilitate determination of which relative bit rate should be assigned to a particular terminal. Further, by considering terminal capacity, differentiating among terminals is greatly improved. Thus, with the present invention, a network operator will be able to assign a bit rate to a terminal which better reflects the actual conditions while still taking into account the subscription status. This is undertaken by creating a reference weighting factor, $w_{ref}$, which considers the target QoS parameter as well as either one or both of the channel condition measure and the capacity measure of the terminal. The value of the weighting factor at any given moment will determine the bit rate assigned to the terminal. The assigned bit rate may either have a linear or non-linear relationship to the reference weighting factor.

In an embodiment of the present invention, the measure reflecting a channel condition of the terminal is a Channel Quality Indicator (CQI) for the terminal. Advantageously, the CQI can be used for implementing a policy on the trade off between user resource usage and QoS compliance. A high-value CQI implies a favorable radio environment for the terminal, and the cost associated with providing a high-CQI terminal with a certain bit rate is lower as compared to providing the same bit rate to a terminal with lower CQI. Thus, in order not to decrease network throughput as a result of providing a higher QoS than necessary, it is advantageous to gradually reduce the provided QoS for users in a generally poor radio environment. Hence, a terminal having poor long-term channel conditions (as reflected by a measured long-term CQI) shall have a reference weighting factor $w_{ref}$ which is reduced by a correspondingly reduced channel condition weighting factor $w_{CQI}$. For instance, the channel condition weighting factor $w_{CQI}$ may increase linearly from 0 to 100% when the CQI increases from 0 up until an appropriately selected threshold value "X", whereupon $w_{CQI}$ remains at 100% with further increasing CQI. Such mapping can be undertaken by means of using a look-up table or an appropriate algorithm. Consequently, at the one extreme, if the CQI exceeds a threshold value "X" and thus is considered sufficiently high, $w_{CQI}$ will be fully weighted at 100% and will consequently affect that reference weighting factor $w_{ref}$ accordingly while at the other extreme, if the CQI is very low, $w_{CQI}$ will be set to a value close to zero, which practically will result in a low-value reference weighting factor $w_{ref}$, giving the terminal a correspondingly low assigned bit rate. It should be noted that a non-linear relationship can be selected between the channel condition weighting factor $w_{CQI}$ and the measured CQI.

In another embodiment of the present invention, the measure reflecting a capacity of the terminal is supported Uu bit rate for the terminal, i.e. the supported bit rate between the terminal and a radio base station (RBS). In this context, it should be noted that the bit rate represents the bit rate supported over the air-interface Uu between the terminal and the RBS. Thus, the capacity measure of the terminal may very well be affected by parameters remote from the terminal itself, in that the maximum supported capacity of the Uu interface may be limited by capacity constraints of the RBS, such as supported modulation or other transmission resources. Advantageously, the terminal capacity measure—in this embodiment implemented in the form of the Uu bit rate supported by the terminal—can be used for differentiating terminal bit rate. For instance, one type of terminal may support a maximum bit rate of 7 Mb/s, while another type of terminal supports 2 Mb/s, and this could advantageously be reflected in the reference weighting factor $w_{ref}$. Further, a user may have purchased a premium terminal with an associated subscription, which would be reflected by giving the premium terminal a higher-value terminal capacity weighting factor $w_{UuSupp}$ as compared to a "budget" terminal. Similar to the previously discussed channel condition weighting factor $w_{CQI}$, the terminal capacity weighting factor $w_{UuSupp}$ may increase linearly from 0 to 100% when the supported Uu bit rate increases from 0 up until a value "Y", say about 2 Mbps, whereupon $w_{UsSupp}$ remains at 100% with further increasing supported Uu bit rate. Again, such mapping can be undertaken by means of using a look-up table or an appropriate algorithm. Consequently, at the one extreme, if the terminal supports a high Uu bit rate, $w_{UuSupp}$ will generally be fully weighted at 100% and will consequently affect that reference weighting factor $w_{ref}$ accordingly while at the other extreme, if the terminal only supports a low Uu bit rate, $w_{UuSupp}$ will be set to a low value accordingly, possibly even a value close to zero, which practically will result in a low-value reference weighting factor $w_{ref}$, giving the terminal a correspondingly low assigned bit rate. Again, a non-linear relationship can be selected between terminal capacity weighting factor $w_{UuSupp}$ and the supported Uu bit rate.

It should be noted that even though the capacity measure of a terminal is embodied in the form of supported Uu bit rate in the application, various other terminal capacity measures could be used. For instance a particular terminal type can be given a particular capacity measure; terminal type A is assigned a terminal capacity weighting factor of 50%, terminal type B is assigned a terminal capacity weighting factor of 70%, terminal type C is assigned a terminal capacity weighting factor of 100%, etc. Other possible capacity measures are maximum output power, number of codes used, potential modulation types, etc.

As is described in the above, the channel condition weighting factor $w_{CQI}$ is derived from the acquired channel condition measure of the terminal according to a defined relation between the channel condition measure and channel condition weighting factor, which relation typically is defined by the network operator and could take on any appropriate form, be it linear or non-linear. Analogously, the terminal capacity weighting factor $w_{UuSupp}$ is derived from the acquired terminal capacity measure according to a defined relation between the terminal capacity measure and terminal capacity weighting factor.

In a further embodiment of the present invention, both the measure reflecting a channel condition of the terminal and the measure reflecting terminal capacity is acquired and used along with the predetermined target QoS parameter for creating the reference weighting factor $w_{ref}$. Advantageously, by using three parameters for controlling the bit rate of the terminal, a network operator is given a powerful tool for differentiating between the terminals.

In yet another embodiment of the present invention, the combination of parameters on which the bit rate of the terminal is controlled is the product of the acquired predetermined QoS parameter and the CQI and/or supported Uu bit rate. For instance, for each terminal to be considered, the reference weighting factor is created by multiplying the respective weighting factor associated with each parameters, $w_{ref} = w_{QoS} \times w_{CQI} \times w_{UuSupp}$, where the target QoS weighting factor reflects the target QoS to be given to the terminal and the terminal for which the greatest reference weighting factor is calculated is assigned the highest bit rate. Thus, even though a Gold subscription is associated with a first terminal, and a Bronze subscription is associated with a second terminal, the second terminal could still be assigned a greater bit rate if its CQI and/or supported Uu bit rate is sufficiently high to produce a reference weighting factor which is greater than the reference weighting factor calculated for the Gold terminal. Other arithmetic operations for calculating the weight, such as for instance addition, can be envisaged.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
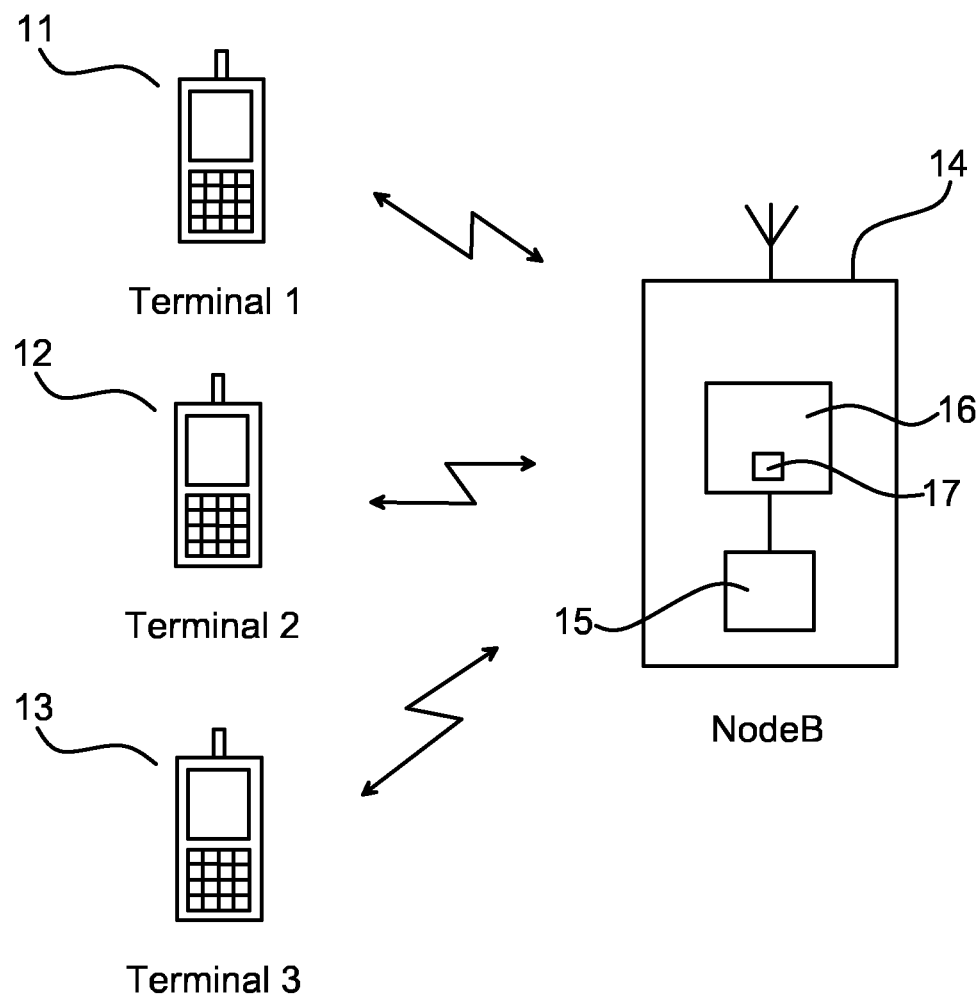
FIG. 1 illustrates a network of terminals communicating with a device according to embodiments of the present invention.

FIG. 1 illustrates a group of terminals 11, 12, 13 communicating with a device 14 being e.g. a radio base station such as a NodeB. The controlling of the bit rate of the terminals according to embodiments of the present invention is managed by a bit rate controller 15 in the NodeB. It should be noted that the bit rate controller 15 could be implemented in other network components than the Node B 14, such as e.g. in an RNC). This is advantageous in that the bit rate control is managed by a central function which has the capability of supervising the terminals 11, 12, 13 and thus take into account channel condition and capacity aspects of all terminals, and ultimately optimize overall network performance. In practice, the bit rate controller 15 is embodied on the form of one or more microprocessors arranged to execute a computer program 17 downloaded to a suitable storage medium 16 associated with the microprocessor, such as a RAM, a Flash memory or a hard disk. The microprocessor 15 is arranged to at least partly carry out the method according to embodiments of the present invention when the appropriate computer program 17 comprising computer-executable components is downloaded to the memory 16 and executed by the microprocessor 15. The storage medium 16 may be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The microprocessor 15 may alternatively be embodied in the form of an application specific integrated circuit (ASIC), a field-programmable gate array (FPGA), a complex programmable logic device (CPLD), etc.

The method of the present invention can advantageously be implemented in High-Speed Packet Access (HSPA) networks both for High-Speed Downlink Packet Access (HSDPA) and High-Speed Uplink Packet Access (HSUPA)

Figure 2:
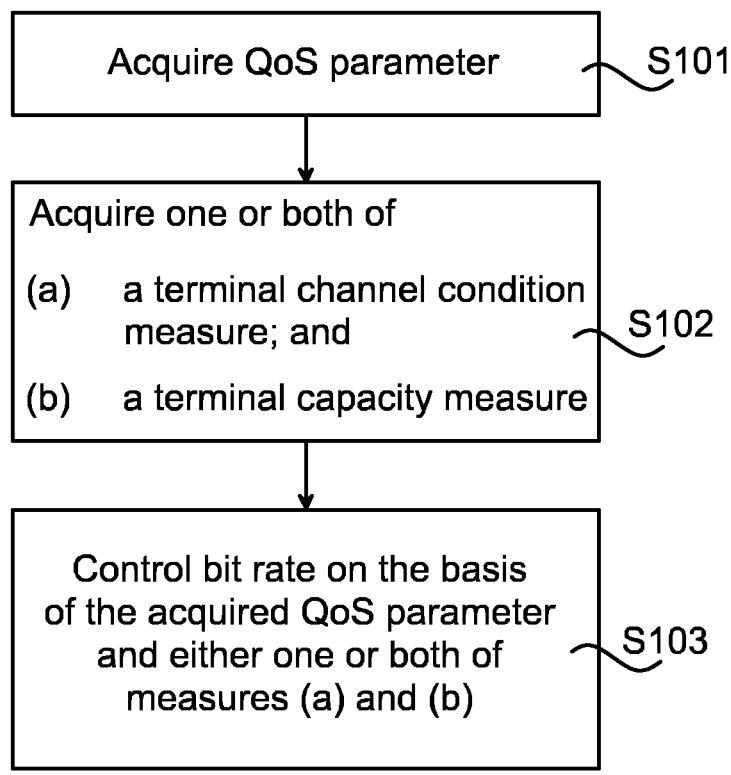
FIG. 2 shows a flow chart illustrating the method of controlling bit rate of a terminal according to an embodiment of the present invention.

In an exemplifying embodiment described with reference to FIG. 1 and FIG. 2 illustrating a flow chart of a method according to an embodiment of the present invention, terminal 1 is assumed to have a Bronze subscription, while terminal 2 holds a Silver subscription and terminal 3 has a Gold subscription. A target QoS weighting factor $w_{QoS}$ is thus acquired in step S101 for the respective terminal reflecting the subscription held. This target is typically set by the network operator and supplied to the bit rate controller 15 comprised in NodeB 14. Further, the NodeB acquires in step S102 either one or both of (a) the CQI of each terminal and (b) the supported Uu bit rate of each terminal and determines the corresponding channel condition weighting factor $w_{CQI}$ associated with the respective CQI and the corresponding channel condition weighting factor $w_{UuSupp}$ associated with the respective supported Uu bit rate. Finally, in step S103, the bit rate of the respective terminal is controlled on the basis of a reference weighting factor $w_{ref}$ for each terminal created by a combination of the acquired QoS parameter and either one or both of the acquired CQI and the supported Uu bit rate. The CQI and the supported Uu bit rate are typically acquired by the NodeB 14 in that a request is sent to each terminal 11, 12, 13 requesting the terminal to report their CQI and supported Uu bit rate. In the following, it is assumed that both the CQI and the supported Uu bit rate are considered when controlling the bit rate of the terminals.

The table below illustrates an example where numeric values are given for the respective weighting factor. The reference weighting factor $w_{ref}$ is calculated as the product of $w_{QoS}$, $w_{CQI}$ and $w_{UuSupp}$.

|  | Terminal 1 (Bronze) | Terminal 2 (Silver) | Terminal 3 (Gold) |
| --- | --- | --- | --- |
| $w_{QoS}$ | 1 | 2 | 4 |
| $w_{CQI}$ | 0.8 | 0.4 | 0.8 |
| $w_{UuSupp}$ | 0.5 | 0.4 | 0.4 |
| $w_{ref}$ | 0.4 | 0.32 | 1.28 |

As can be deducted from the table, terminal 3 is given the highest target QoS due to its subscription status, and should be assigned a bit rate twice that of terminal 2 and four times that of terminal 1, if channel and capacity conditions for the three terminals were equal. However, of the three terminals, terminal 2 has the worst channel conditions, which is reflected by the channel condition weighting factor $w_{CQI}$. Again, everything else equal, terminal 2 would be assigned half the bit rate of terminals 1 and 2. Further, terminal 1 has a slightly higher capacity measure than terminals 1 and 3 and thus has the highest-value capacity weighting factor $w_{UuSupp}$. The reference weighting factor $w_{ref}$ used to assign bit rates is in this particular exemplifying embodiment of the present invention calculates as a product of the three weighting factors $w_{QoS}$, $w_{CQI}$ and $w_{UuSupp}$. Again with reference to the table in the above, if both channel conditions are good and terminal capacity is high, i.e. $w_{CQI}$ and $w_{UuSupp}$ are both 1 (or close to 1), differentiation among the terminals is based almost solely on the target QoS. Thus, with good channel conditions and high terminal capacity, the differentiation will be undertaken on the basis of $w_{QoS}$ since $w_{ref} \approx w_{QoS}$, and the network operator is able to differentiate in accordance with the subscription status. On the other hand, if either channel conditions are bad and/or terminal capacity is low, $w_{CQI}$ and $w_{UuSupp}$ will have a greater impact on the differentiation.

An interesting observation to be made is that—primarily due to channel conditions in this particular example—terminal 1 actually is assigned a bit rate which is slightly higher than that of terminal 2, despite the differences in subscriptions. Thus, with the present invention, the network operator is given a powerful tool for differentiating between terminals by taking into account not only preset target QoS parameters but also actual channel condition parameters and terminal capacity parameters. With the present invention it will be easier for the network operator to achieve a terminal bit rate which actually conforms with the parameters that are input to the process for controlling terminal bit rate. Hence, the configuration of terminal bit rates becomes deterministic to a much higher extent. A further observation that can be made from the numeric values set forth in the table above is that network throughput can be increased by assigning to a terminal a lower bit rate than warranted by the target QoS parameter, in that further measures are considered.

Figure 3:
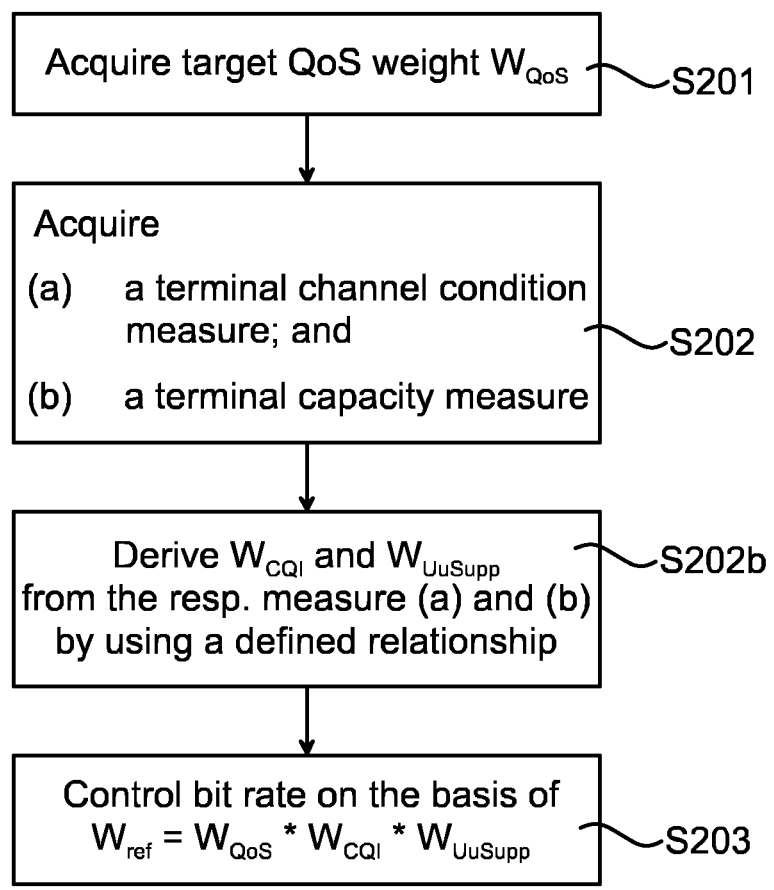
FIG. 3 shows a flow chart illustrating the method of controlling bit rate of a terminal according to an embodiment of the present invention.
Figure 4:
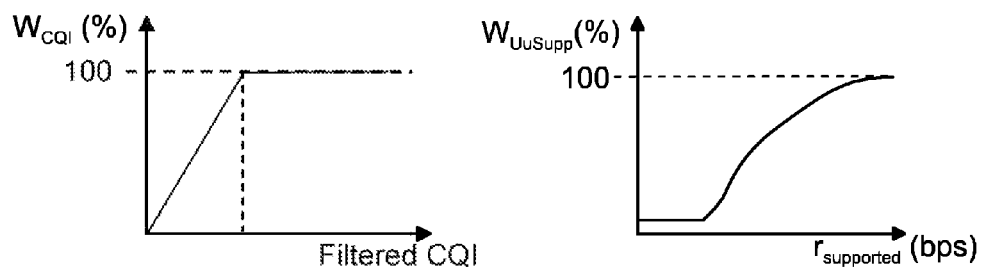
FIG. 4 illustrates on its left-hand side an exemplifying defined relationship between the channel condition weighting factor $w_{CQI}$ and the acquired channel condition measure and on its right-hand side a relationship between the terminal capacity weighting factor $w_{UuSupp}$ and the acquired terminal capacity measure.

Thus, with reference to FIG. 3 illustrating a flow chart of the method for controlling terminal bit rate according to an embodiment of the present invention, the NodeB 14 of FIG. 1 acquires a target QoS weighting factor $w_{QoS}$ in step S201 for the respective terminal 11, 12, 13 reflecting the subscription held. Further, the NodeB acquires in step S202 the CQI and the supported Uu bit rate of each terminal and determines the corresponding channel condition weighting factor $w_{CQI}$ associated with the respective CQI and the corresponding channel condition weighting factor $w_{UuSupp}$ associated with the respective supported Uu bit rate. FIG. 4 exemplifies on its left-hand side a defined relationship between the channel condition weighting factor $w_{CQI}$ and the acquired channel condition measure CQI. Thus, $w_{CQI}$ is derived in step S202b from the acquired CQI using the defined relationship. As previously has been mentioned, the relation is typically defined by the network operator and could take on any appropriate form, linear or non-linear. The right-hand side of FIG. 4 exemplifies a defined relationship between the terminal capacity weighting factor $w_{UuSupp}$ and the acquired terminal capacity measure, i.e. supported Uu bit rate. Analogously $w_{UsSupp}$ is also derived in step S202b from the acquired supported Uu bit rate using the defined relationship. Finally, in step S203, the bit rate of the respective terminal is controlled on the basis of a reference weighting factor $w_{ref}$ for each terminal being a product of the target QoS weighting factor $w_{QoS}$, the derived channel condition weighting factor $w_{CQI}$ and the derived terminal capacity weighting factor $w_{UuSupp}$.

Figure 5:
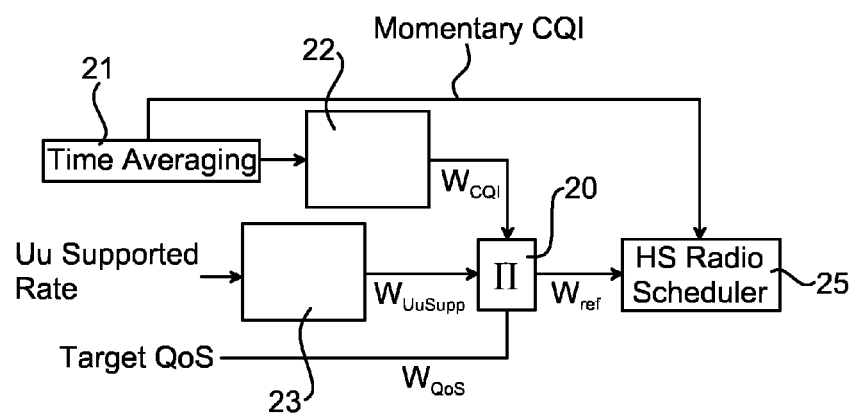
FIG. 5 illustrates a bit rate controller according to an embodiment of the present invention.

With reference to FIG. 5, a bit rate controller according to an embodiment of the present invention is illustrated. With reference to FIG. 1, the bit rate controller 15 is typically implemented in a device in the network with terminal-supervision capability such as NodeB 14. The bit rate controller 15 implements the method of embodiments of the present invention as has been described with reference to previous drawings. In FIG. 5, showing an open-loop control, a target QoS weighting factor $w_{QoS}$ is acquired for the respective terminal 11, 12, 13 reflecting the subscription held and supplied to multiplier 20. Further, the NodeB acquires the momentary CQI, which optionally may be time averaged by a filter 21 to produce a long-term CQI which is supplied to CQI mapping function 22 for deriving a channel condition weighting factor $w_{CQI}$ (as was described with reference to FIG. 4), as well as the supported Uu bit rate of each terminal which correspondingly is supplied to a Uu bit rate mapping function 23 for deriving a channel condition weighting factor $w_{UuSupp}$. Subsequently, $w_{CQI}$ and $w_{UuSupp}$ are supplied to multiplier 20, which calculates the reference weighting factor $w_{ref}$, which determines the respective bit rate assigned to each terminal, as a product of $w_{QoS}$, $w_{CQI}$ and $w_{UuSupp}$. Thereafter, the reference weighting factor $w_{ref}$ is supplied to a radio scheduler 25, being the component which assigns a certain bit rate to a particular terminal 11, 12, 13 on the basis of the reference weighting factor $w_{ref}$. As previously mentioned, the bit rate controller 15 is generally implemented in the form of a microprocessor. Even though reference is made to numbered blocks and components, the corresponding functionality are generally implemented by having the microprocessor execute an appropriate computer program. The blocks and components are thus necessarily not implemented in the form of specific hardware blocks but could be viewed upon as functions carried out by the microprocessor when executing the computer program. As can be seen in FIG. 5, the measured momentary CQI can optionally be fed-forward to the radio scheduler 25 in order to have the scheduler consider information regarding momentary radio conditions of each terminal when scheduling is performed.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of controlling a bit rate of a terminal included in a group of terminals relative to other terminals in the group, the method comprising:
    acquiring a predetermined Quality of Service (QoS) parameter for the terminal, the acquired predetermined QoS parameter stipulating a target bitrate for the terminal relative to other terminals in the group;
    acquiring at least one measure of a channel condition of the terminal and at least one capacity measure of the terminal, wherein the at least one measure of the channel condition of the terminal is a Channel Quality Indicator (CQI) for the terminal and the at least one capacity measure of the terminal is a supported Uu bit rate for the terminal; and
    controlling the bit rate of the terminal using a reference weighting factor created by a combination of the acquired predetermined QoS parameter, the acquired at least one measure of the channel condition of the terminal, and the acquired at least one capacity measure of the terminal;
    wherein the created reference weighting factor increases as the channel condition improves and the created reference weighting factor decreases as the channel condition deteriorates.

2. The method of claim 1, wherein the combination is a mathematical product of the acquired predetermined QoS parameter, the acquired at least one measure of the channel condition of the terminal, and the acquired at least one capacity measure of the terminal.

3. The method of claim 2, further comprising:
    deriving a channel condition weighting factor from the acquired at least one measure of the channel condition of the terminal according to a defined relation between the at least one measure of the channel condition of the terminal and channel condition weighting factor;
    deriving a terminal capacity weighting factor from the acquired at least one capacity measure of the terminal according to a defined relation between the at least one capacity measure of the terminal and terminal capacity weighting factor; and wherein
    the combination is a product of a target QoS weighting factor reflecting the acquired predetermined QoS parameter, the derived channel condition weighting factor, and the derived terminal capacity weighting factor.

4. The method of claim 1, wherein a momentary CQI is measured and time averaged, which time averaged CQI is used for creating the reference weighting factor.

5. A computer program product comprising instructions stored on non-transient computer-readable media which, when executed by a processor, perform the steps of claim 1.

6. A device for controlling a bit rate of a terminal included in a group of terminals relative to other terminals in the group, the device comprising a processor coupled to a memory, the processor configured to:
    acquire a predetermined Quality of Service (QoS) parameter for the terminal, the acquired predetermined QoS parameter stipulating a target bitrate for the terminal relative to other terminals in the group;
    acquire at least one measure of a channel condition of the terminal and at least one capacity measure of the terminal, wherein the at least one measure of the channel condition of the terminal is a Channel Quality Indicator (CQI) for the terminal and the at least one capacity measure of the terminal is a supported Uu bit rate for the terminal; and
    control the bit rate of the terminal using a reference weighting factor created by a combination of the acquired predetermined QoS parameter, the acquired at least one measure of the channel condition of the terminal, and the acquired at least one capacity measure of the terminal;
    wherein the created reference weighting factor increases as the channel condition improves and the created reference weighting factor decreases as the channel condition deteriorates.

7. The device of claim 6, wherein the combination is a mathematical product of the acquired predetermined QoS parameter, the acquired at least one measure of the channel condition of the terminal, and the acquired at least one capacity measure of the terminal.

8. The device of claim 7, the processor further configured to:
    derive a channel condition weighting factor from the acquired at least one measure of the channel condition of the terminal according to a defined relation between the at least one measure of the channel condition of the terminal and channel condition weighting factor;
    derive a terminal capacity weighting factor from the acquired at least one capacity measure of the terminal according to a defined relation between the at least one capacity measure of the terminal and terminal capacity weighting factor; and wherein
    the combination is a product of a target QoS weighting factor reflecting the acquired predetermined QoS parameter, the derived channel condition weighting factor, and the derived terminal capacity weighting factor.

9. A computer program product comprising instructions stored on non-transient computer-readable media which, when executed by a processor, perform the steps of claim 6.

* * * * *